US008587543B2

(12) United States Patent
Kobayashi et al.

(10) Patent No.: US 8,587,543 B2
(45) Date of Patent: Nov. 19, 2013

(54) DISPLAY CONTROL DEVICE AND DISPLAY CONTROL METHOD

(75) Inventors: Akihiko Kobayashi, Tokyo (JP); Akira Nakanishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 339 days.

(21) Appl. No.: 13/184,185

(22) Filed: Jul. 15, 2011

(65) Prior Publication Data
US 2012/0162103 A1    Jun. 28, 2012

(30) Foreign Application Priority Data

Dec. 28, 2010  (JP) ................................. 2010-293456

(51) Int. Cl.
*G06F 3/041*    (2006.01)
*G06F 3/01*    (2006.01)
(52) U.S. Cl.
USPC ......................................... 345/173; 715/702
(58) Field of Classification Search
USPC ......................................... 345/173; 715/702
See application file for complete search history.

(56) References Cited

U.S. PATENT DOCUMENTS

| 2004/0196267 A1* | 10/2004 | Kawai et al. ................... 345/173 |
| 2008/0129759 A1* | 6/2008 | Jeon et al. ...................... 345/667 |
| 2011/0060986 A1* | 3/2011 | Yang .............................. 715/702 |
| 2012/0086726 A1* | 4/2012 | Matsumoto ................... 345/629 |

FOREIGN PATENT DOCUMENTS

| JP | 05-127853 | 5/1993 |
| JP | 09-245199 | 9/1997 |
| JP | 2001-202197 | 7/2001 |
| JP | 2002-328040 | 11/2002 |

OTHER PUBLICATIONS

Japanese Patent Application No. 2010-293456; Notice of Rejection; Mailed Sep. 27, 2011 (with English translation).

* cited by examiner

*Primary Examiner* — Ariel Balaoing
(74) *Attorney, Agent, or Firm* — Blakely, Sokoloff, Taylor & Zafman LLP

(57) ABSTRACT

According to one embodiment, a display control device includes an area determination module, a direction determination module, and a display controller. The area determination module determines, on a touch panel having input coordinates corresponding to display coordinates of a display module, whether at least part of a touch area where a touch object touches is present in a predetermined area in a display area displaying an object displayed on the display module. The direction determination module determines a movement direction of the touch area. The display controller displays the object as being zoomed in or zoomed out based on determination results of the area determination module and the direction determination module.

14 Claims, 11 Drawing Sheets

O1  O2  O3                    14

A  C  B

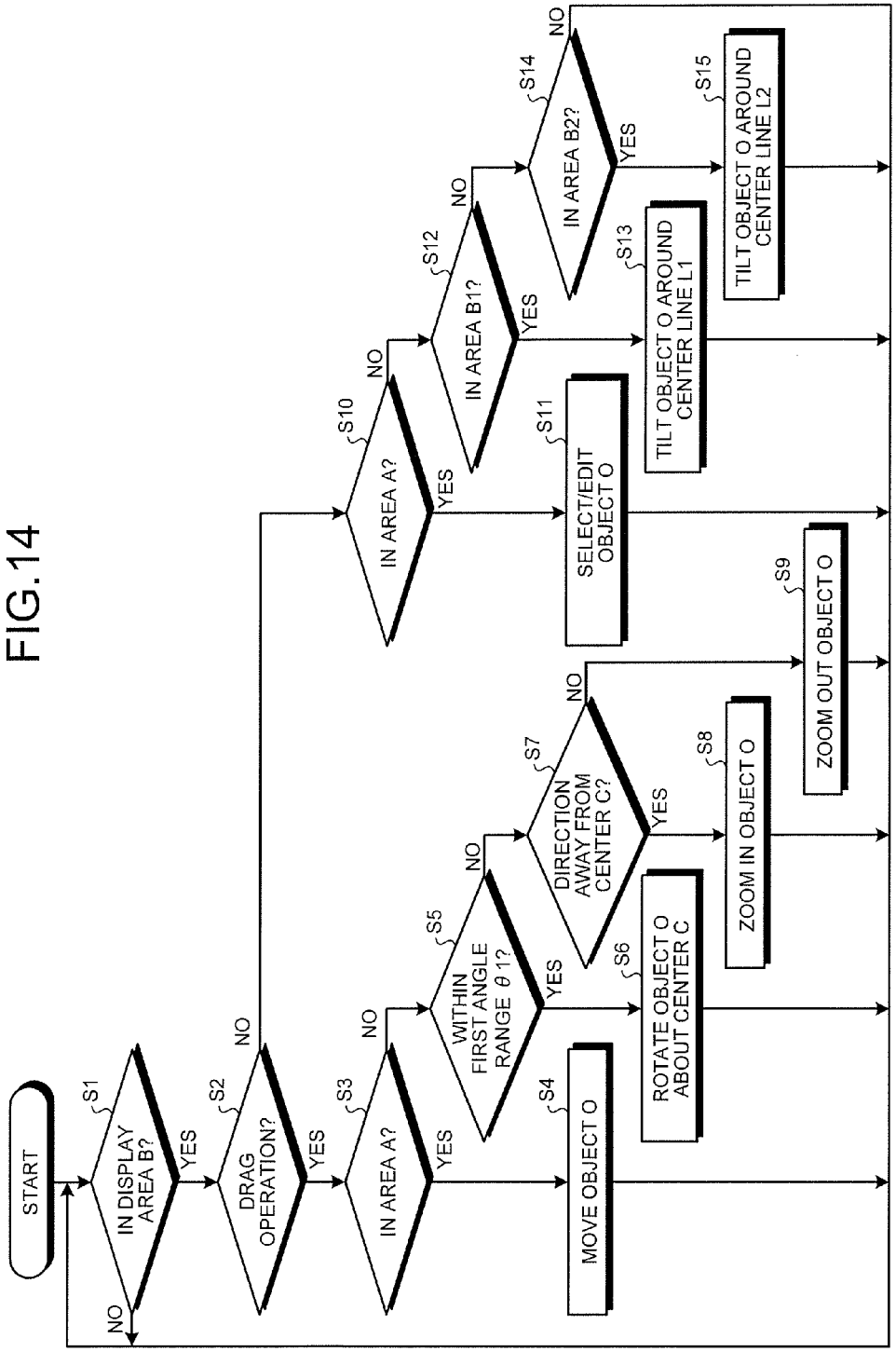

DISPLAY CONTROL DEVICE AND DISPLAY CONTROL METHOD

CROSS-REFERENCE TO RELATED APPLICATIONS

This application is based upon and claims the benefit of priority from Japanese Patent Application No. 2010-293456, filed Dec. 28, 2010, the entire contents of which are incorporated herein by reference.

FIELD

Embodiments described herein relate generally to a display control device and a display control method.

BACKGROUND

In recent years, there has been a widespread use of a display device such as a liquid crystal display (LCD) provided with a touch panel on its surface in display control devices such as tablet personal computers (PCs), portable electronic devices, and the like.

In these conventional display control devices, a displayed object such as an image and an icon can be zoomed in or out by, for example, touching the object with two fingers and increasing or decreasing the distance between the fingers or operating zoom buttons provided to the main body or as desktop images.

In the conventional display control devices, it is required to operate an object with two fingers or to press a zoom button to zoom in or out the object. Thus, further improvement is required in the operability.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 14 is an exemplary flowchart of a display control process performed by the display control device for the object in the embodiment.

DETAILED DESCRIPTION

In general, according to one embodiment, a display control device comprises an area determination module, a direction determination module, and a display controller. The area determination module is configured to determine, on a touch panel having input coordinates corresponding to display coordinates of a display module, whether at least part of a touch area where a touch object touches is present in a predetermined area in a display area displaying an object displayed on the display module. The direction determination module is configured to determine a movement direction of the touch area. The display controller is configured to display the object as being zoomed in or zoomed out based on determination results of the area determination module and the direction determination module.

Figure 1:
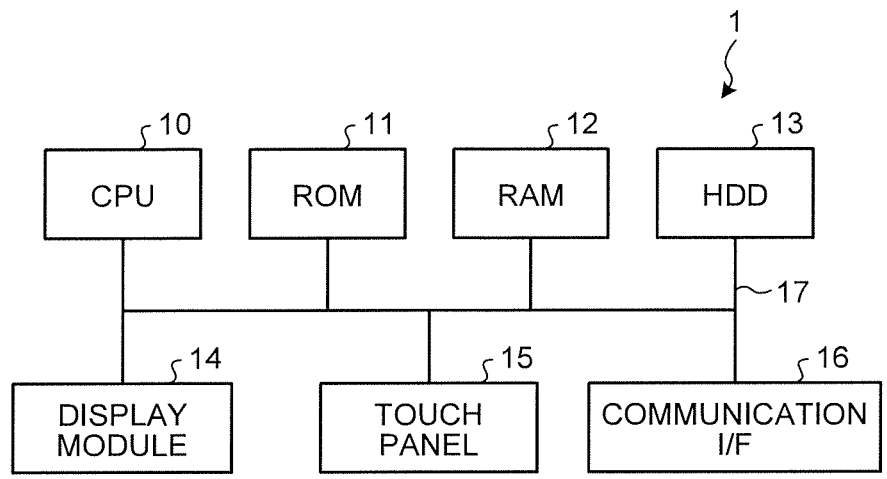
FIG. 1 is an exemplary block diagram of a hardware configuration of a display control device according to an embodiment.

FIG. 1 is a block diagram of a hardware configuration of a display control device 1 according to an embodiment. The display control device 1 of the embodiment may be, for example, a tablet personal computer (PC), a portable electronic device with touch panel, or the like.

As illustrated in FIG. 1, the display control device 1 comprises a central processing unit (CPU) 10, a read only memory (ROM) 11, a random access memory (RAM) 12, a hard disk drive (HDD) 13 as a storage device, a display module 14, a touch panel 15, and a communication interface (I/F) 16, which are connected by a bus 17. That is, the display control device 1 has a hardware configuration of a general personal computer. The storage device is not limited to the HDD 13, but may be, for example, a solid state drive (SSD).

The ROM 11 stores a computer program of the embodiment, various other programs, and various types of setting data. The RAM 12 temporarily stores a program and data when the CPU 10 executes the program. The CPU 10 loads a program from the ROM 11 into the RAM 12 and executes it, thus functioning as a controller that executes the computer program of the embodiment. The communication I/F 16 controls data communication with other information processors and the like via a local area network (LAN), the Internet, or the like.

The display module 14 displays various screens under the control of the CPU 10. Upon receipt of a display signal from the CPU 10, the display module 14 displays video such as still images and moving images.

The touch panel 15 is a commonly used touch panel such as a capacitance-type touch panel or a pressure-sensitive touch panel. The touch panel 15 detects a touch thereon by a touch object such as, for example, a finger, and sends positional information on the touch area of the touch object to the CPU 10. The input position (input coordinates) on the touch panel 15 corresponds to or match the display position (display coordinates) on the display module 14.

Figure 2:
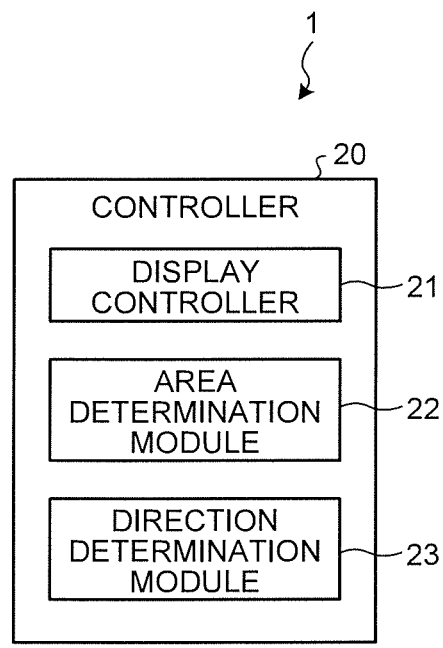
FIG. 2 is an exemplary functional block diagram of the display control device in the embodiment.

Described below is a functional configuration of the display control device 1. FIG. 2 is a functional block diagram of the display control device 1. In the display control device 1, the CPU 10 loads the computer program of the embodiment from the ROM 11 into the main memory and executes it, thereby implementing a controller 20 on the main memory. As illustrated in FIG. 2, the controller 20 comprises a display controller 21, an area determination module 22, and a direction determination module 23.

The display controller 21 displays various types of screen on the display module 14 according to a program stored in the ROM 11 or input operation on the touch panel 15. The display controller 21 also displays an object O such as an image or an icon on the display module 14 based on data stored in the HDD 13 and a program stored in the ROM 11.

Figure 3:
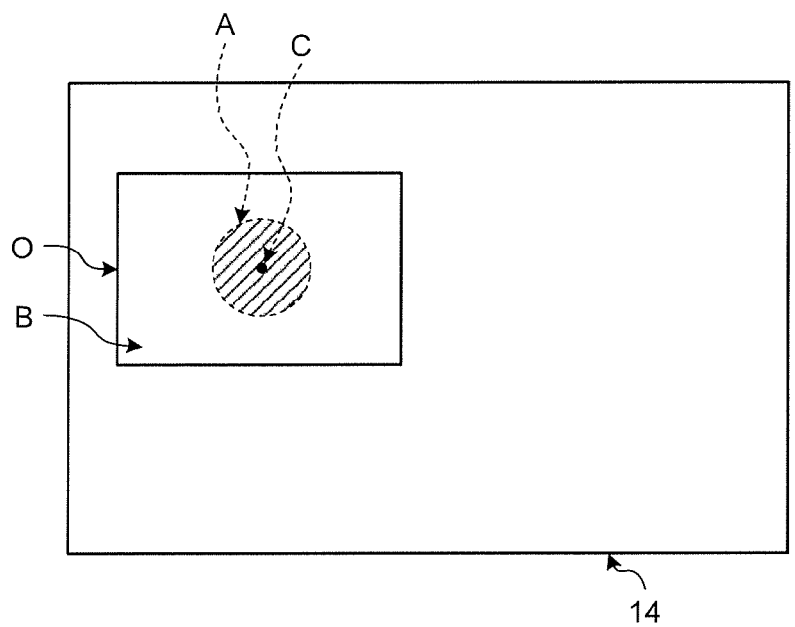
FIG. 3 is an exemplary schematic diagram of an object displayed on a display module in the embodiment.

FIG. 3 is a schematic diagram of an example of an object O displayed on the display module 14. In FIG. 3, a display area B is an area where the object O is displayed. As illustrated in FIG. 3, using the center C of the display area B of the object O as the center, a predetermined area A is defined in advance by a circle of a size falling inside the display area B. For example, if the object O is rectangular as illustrated in FIG. 3, the inside of a circle is set as the area A that has a radius corresponding to a predetermined ratio (for example, 50%) of the length of the short side of the rectangle.

Incidentally, while the center C of the object O and the area A is supposed not to be displayed on the display module 14, they may be displayed when the touch panel 15 is touched.

Figure 4:
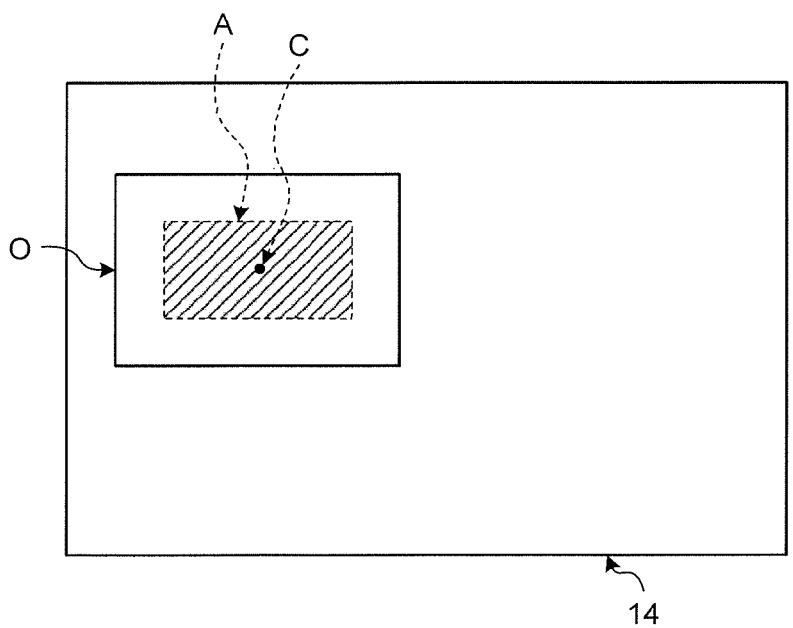
FIG. 4 is an exemplary schematic diagram of an area A in the embodiment.

FIG. 4 is a schematic diagram of another example of the area A. As illustrated in FIG. 4, using the center C of the object O as the center, the area A may be defined by a shape (in FIG. 4, rectangle) similar to the object O in a size falling inside the display area B of the object O.

The area determination module 22 determines a touch area T where a touch object such as a finger touches on the touch panel 15. More specifically, the area determination module 22 determines whether at least part of the touch area T is present in the display area B of the object O. The area determination module 22 also determines whether at least part of the touch area T is present in the area A. Further, the area determination module 22 determines whether at least part of the touch area T is present in areas B1 and B2, which will be described later.

The direction determination module 23 determines whether drag operation or tap operation is performed. The drag operation moves the touch area T, while the tap operation does not. Having determined that drag operation is performed, the direction determination module 23 determines the movement direction of the touch area T.

The display controller 21 changes the display of the object O according to input operation on the touch panel 15 by a touch object. That is, the display controller 21 moves, rotates, or zooms in/out the object O based on the determination results of the area determination module 22 and the direction determination module 23 to display it. Thus, the user can operates the object O on the display screen of the display module 14.

A description will be given of the display change of the object O (how to operate the object O) when drag operation is performed on the touch panel 15. If the object O is dragged on the touch panel 15, the display control device 1 of the embodiment performs one of move operation, rotation operation, zoom-in operation, and zoom-out operation on the object O.

Figure 5A:
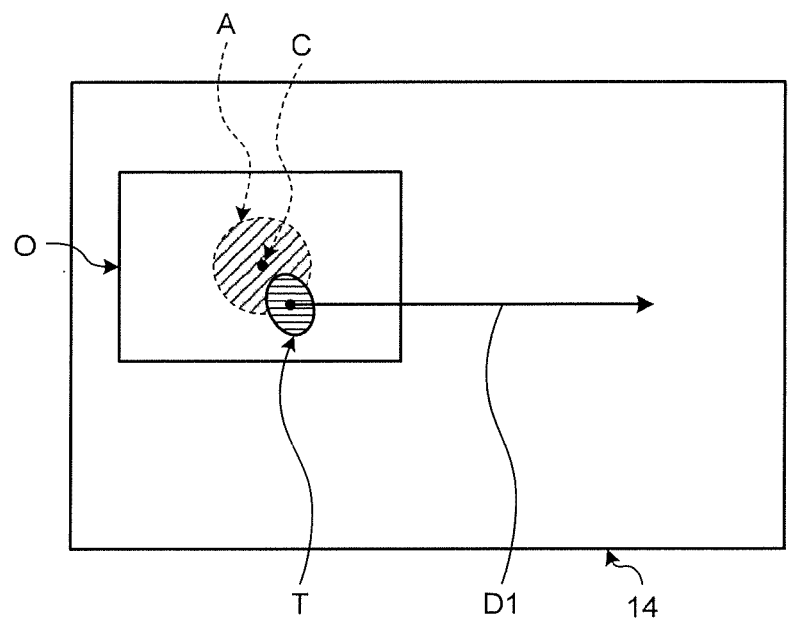
FIG. 5A is an exemplary schematic diagram of the object before move operation in the embodiment.
Figure 5B:
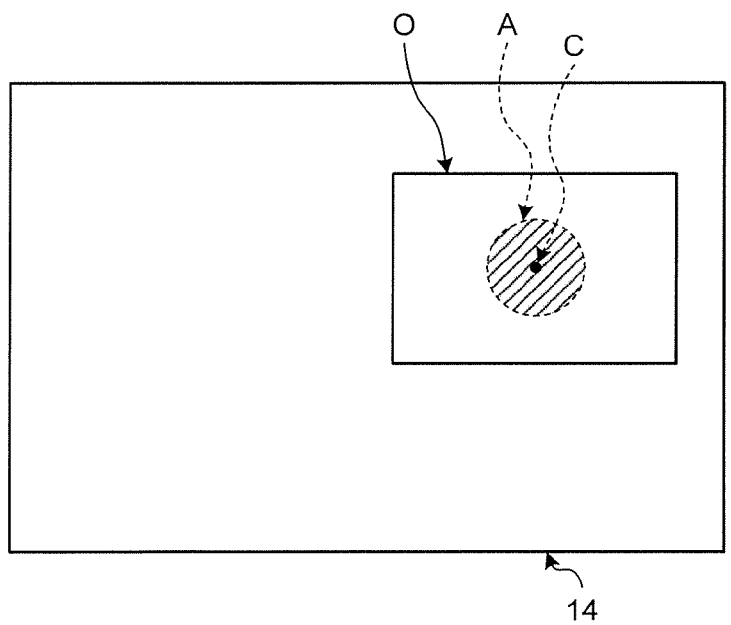
FIG. 5B is an exemplary schematic diagram of the object after move operation in the embodiment.

First, with reference to FIGS. 5A and 5B, a description will be given of the move operation of the object O. FIG. 5A is a schematic diagram of an example of the object O before the move operation. FIG. 5B is a schematic diagram of an example of the object O after the move operation.

As illustrated in FIG. 5A, if the touch area T, at least part of which is in the area A, is dragged, the display controller 21 moves the object O in the direction in which the touch area T is dragged (operation direction). That is, if the touch area T moves along movement direction D1 in FIG. 5A, the display controller 21 moves the object O along the movement direction D1. When a touch object is separated from the touch panel 15 (see FIG. 5B), the display controller 21 stops moving the object O.

Figure 6A:
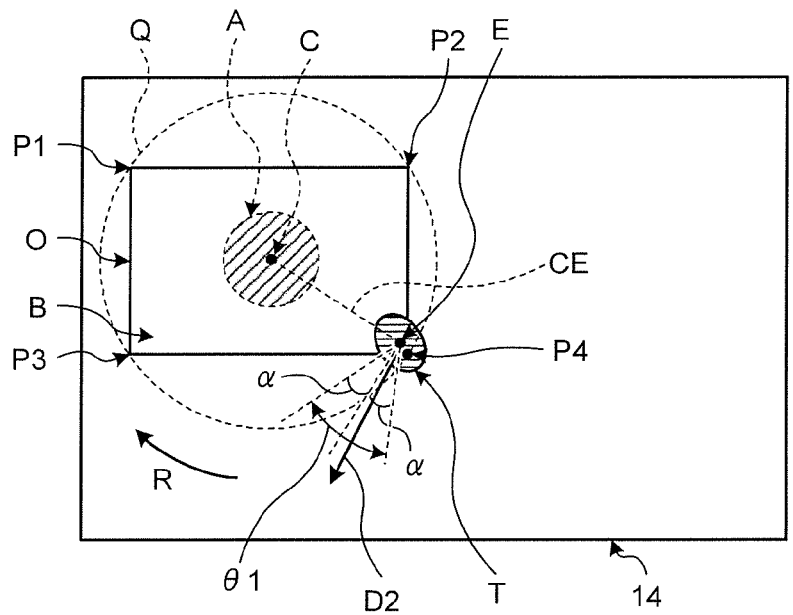
FIG. 6A is an exemplary schematic diagram of the object before rotation operation in the embodiment.
Figure 6B:
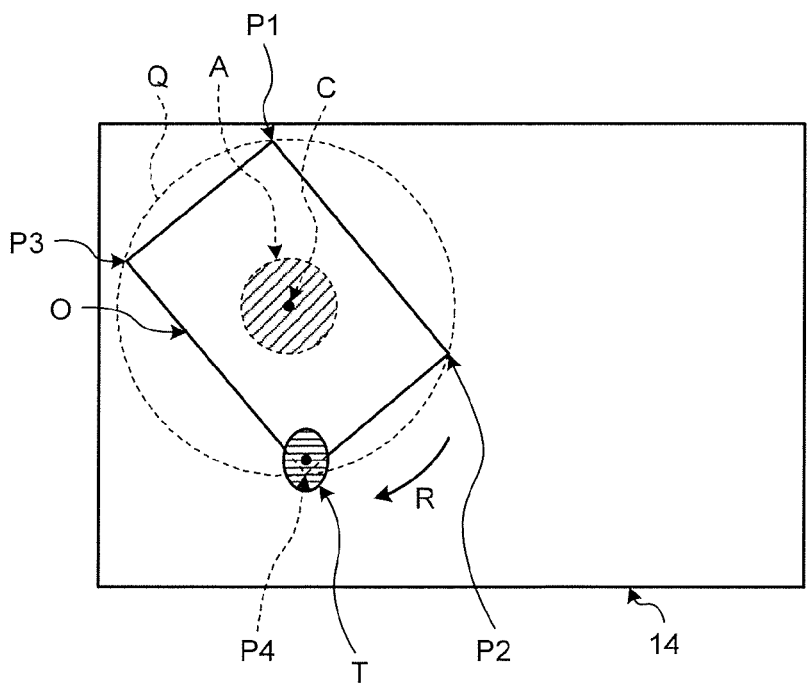
FIG. 6B is an exemplary schematic diagram of the object after rotation operation in the embodiment.

With reference to FIGS. 6A and 6B, a description will be given of the rotation operation of the object O. FIG. 6A is a schematic diagram of an example of the object O before the rotation operation. FIG. 6B is a schematic diagram of an example of the object O after the rotation operation.

As illustrated in FIG. 6A, if at least part of the touch area T is inside the display area B of the object O but outside the area A, and also if movement direction D2 of the touch area T is within the first angle range θ1, the display controller 21 rotates the object O about the center C of the object O as the rotation center to display it. That is, if the object O is rectangular as illustrated in FIG. 6A, the display controller 21 rotates corners P1, P2, P3, and P4 of the object O about the center C along circumference Q of a circle circumscribing the rectangle (see FIG. 6B). It is assumed herein that rotation direction R of the object O is a circumference direction closer to the movement direction D2.

The first angle range θ1 refers herein to an angle range provided with tolerance of angle α on both left and right sides with a direction perpendicular to a straight line CE between the center C of the object O and a point E in the touch area T as its center.

The point E in the touch area T may be the center of the touch area T as illustrated in FIG. 6A. If the touch panel 15 is a pressure-sensitive touch panel, the point E may be where the strongest pressure is applied. Further, the point E may be any other point in the touch area T.

Figure 7A:
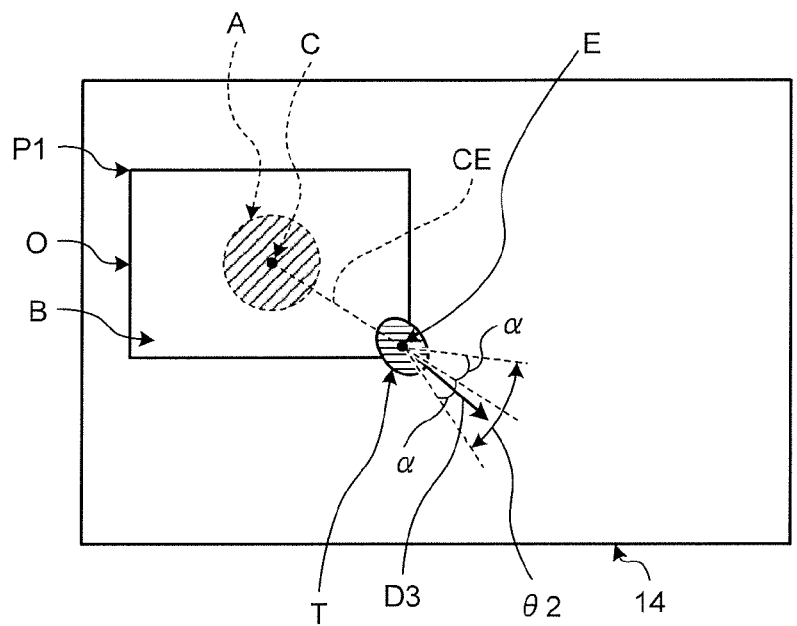
FIG. 7A is an exemplary schematic diagram of the object before zoom-in operation in the embodiment.
Figure 7B:
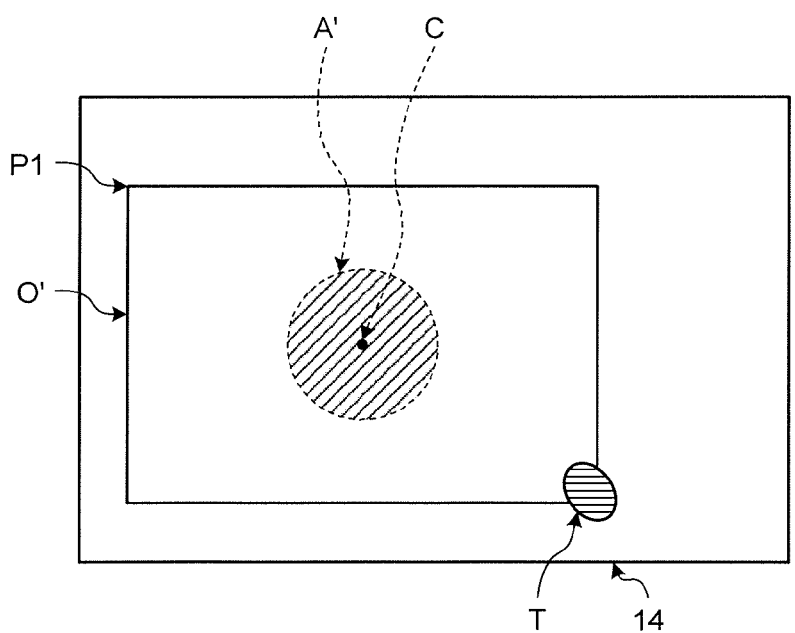
FIG. 7B is an exemplary schematic diagram of the object after zoom-in operation in the embodiment.

With reference to FIGS. 7A and 7B, a description will be given of the zoom-in operation of the object O. FIG. 7A is a schematic diagram of an example of the object O before the zoom-in operation. FIG. 7B is a schematic diagram of an example of the object O after the zoom-in operation.

As illustrated in FIG. 7A, if at least part of the touch area T is inside the display area B of the object O but outside the area A, and also if the touch area T moves toward the outside of the object O in a direction away from the center C of the object O, the display controller 21 zooms in the object O and displays it.

More specifically, if at least part of the touch area T is inside the display area B of the object O but outside the area A, and also if movement direction D3 of the touch area T is within the second angle range θ2 in drag operation, the display controller 21 zooms in the object O according to the drag direction and displays it.

The second angle range θ2 refers herein to an angle range provided with tolerance of angle α on both left and right sides with a direction of a straight line CE between the center C of the object O and a point E in the touch area T as its center.

As illustrated in FIG. 7A, if the object O is rectangular, the object O is zoomed in from the upper left corner P1 as origin, and thereby a zoomed-in object O' is displayed as illustrated in FIG. 7B. The origin of the zoom-in operation is not limited to the corner P1, and the center C of the object O or another corner may be used as the origin. Upon the zoom-in operation, the aspect ratio of the object O may be fixed or changed.

As described above, the area A is defined in a size corresponding to a predetermined ratio of the size of the display area B of the object O. Accordingly, as illustrated in FIG. 7B, a zoomed-in area A' is displayed at the same zoom-in factor as that of the object O.

Figure 8A:
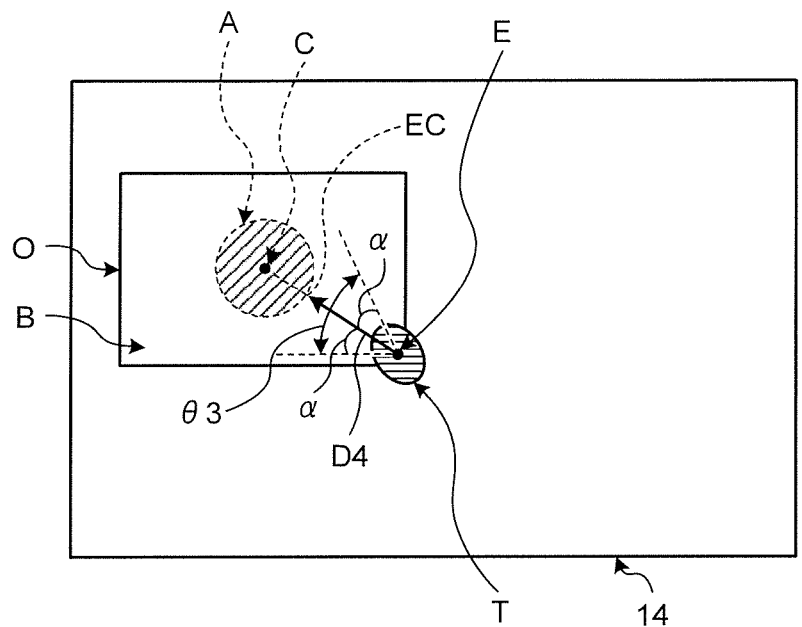
FIG. 8A is an exemplary schematic diagram of the object before zoom-out operation in the embodiment.
Figure 8B:
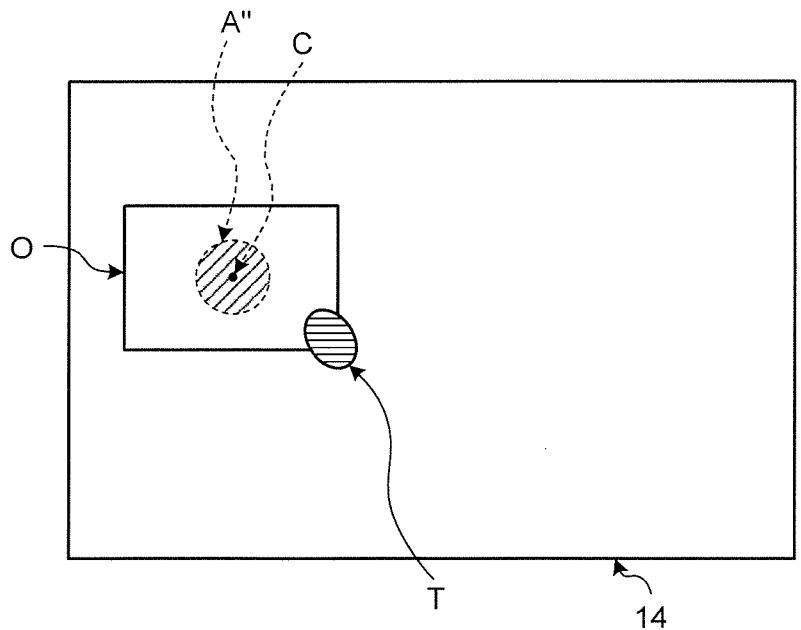
FIG. 8B is an exemplary schematic diagram of the object after zoom-out operation in the embodiment.

With reference to FIGS. 8A and 8B, a description will be given of the zoom-out operation of the object O. FIG. 8A is a schematic diagram of an example of the object O before the zoom-out operation. FIG. 8B is a schematic diagram of an example of the object O after the zoom-out operation.

As illustrated in FIG. 8A, if at least part of the touch area T is inside the display area B of the object O but outside the area A, and also if the touch area T moves toward the inside of the object O in a direction of the center C of the object O, the display controller 21 zooms out the object O and displays it.

More specifically, if at least part of the touch area T is inside the display area B of the object O but outside the area A, and also if movement direction D4 of the touch area T is within the third angle range θ3 in drag operation, the display controller 21 zooms out the object O according to the drag direction and displays it.

The third angle range θ3 refers herein to an angle range provided with tolerance of angle α on both left and right sides with a straight line EC between a point E in the touch area T and the center C of the display area B of the object O as its center.

As in the case of the zoom-in operation, the display controller 21 may zoom out the object O using one of corners of the object O as origin or using the center C of the object O as origin.

As described above, the area A is defined in a size corresponding to a predetermined ratio of the size of the display area B of the object O. Accordingly, as illustrated in FIG. 8B, a zoomed-out area A" is displayed at the same zoom-out factor as that of the object O.

In the following, a description will be given of the display change of the object O (how to operate the object O) when tap operation is performed on the touch panel 15. If the object O is tapped on the touch panel 15, the display control device 1 of the embodiment makes the object O selectable/editable or displays the object O tilted in the depth direction of the screen.

Figure 9A:
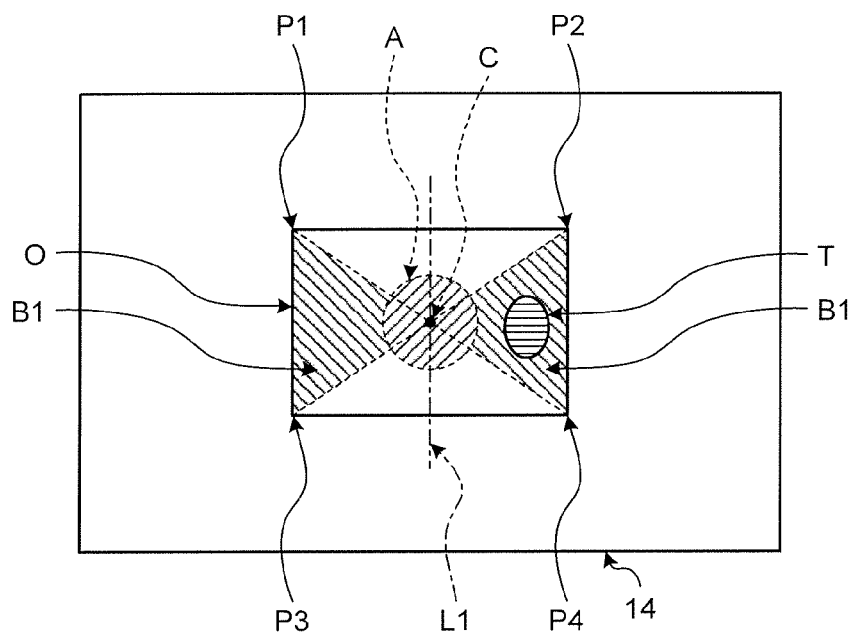
FIG. 9A is an exemplary schematic diagram of the object before tilt operation in the embodiment.
Figure 9B:
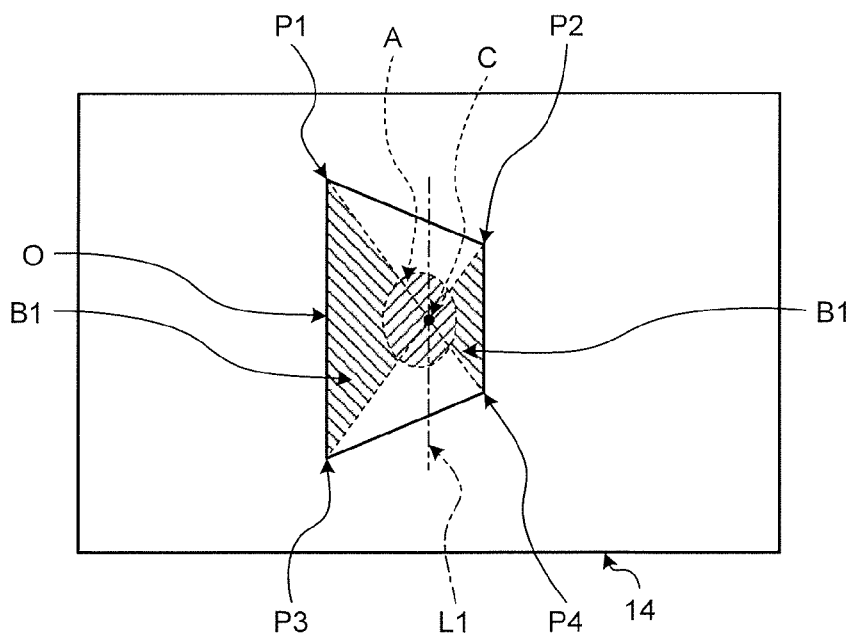
FIG. 9B is an exemplary schematic diagram of the object after tilt operation in the embodiment.
Figure 10A:
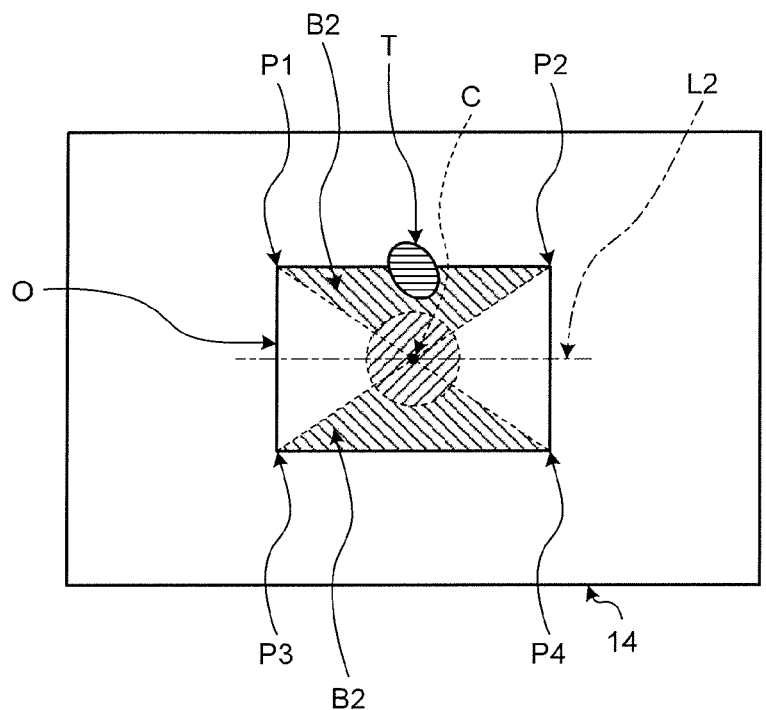
FIG. 10A is an exemplary schematic diagram of the object before tilt operation in the embodiment.
Figure 10B:
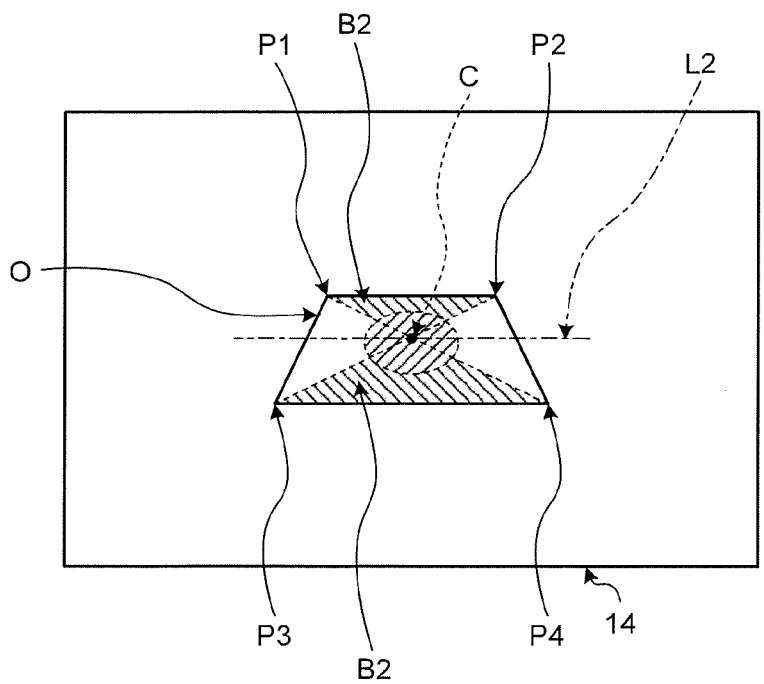
FIG. 10B is an exemplary schematic diagram of the object after tilt operation in the embodiment.

First, with reference to FIGS. 9A, 9B, 10A, and 10B, tilt operation to display the object O as being virtually tilted in the depth direction of the display module 14. FIGS. 9A and 10A are schematic diagrams of examples of the object O before the tilt operation. FIGS. 9B and 10B are schematic diagrams of examples of the object O after the tilt operation.

An example will be described in which, as illustrated in FIGS. 9A, 9B, 10A, and 10B, the object O is rectangular and has four corners P1, P2, P3, and P4. If the object O has a different shape such as, for example, a circular shape, corners of a rectangle circumscribing the object O are used as P1, P2, P3, and P4.

As illustrated in FIG. 9A, the object O is provided with areas B1 which are bilaterally symmetric with respect to the center C outside the area A in the display area B. That is, the areas B1 contains a portion obtained by eliminating the area A from a triangle CP1P3 formed of lines CP1 and CP3 connecting the center C of the object O and the corners P1 and P3, respectively, and a vertical side P1P3 of the rectangle and a portion obtained by eliminating the area A from a triangle CP2P4 formed of lines CP2 and CP4 connecting the center C of the object O and the corners P2 and P4, respectively, and a vertical side P2P4 of the rectangle.

As illustrated in FIG. 9A, if tap operation is performed when at least part of the touch area T is present in the area B1, as illustrated in FIG. 9B, the display controller 21 virtually tilts the object O in the depth direction of the screen around the vertical center line L1 of the object O and displays it. In this case, the display controller 21 displays the object O being tilted as if a tapped position (the position of the touch area T) is pressed in the depth direction of the screen.

As illustrated in FIG. 10A, the object O is provided with areas B2 which are vertically symmetric with respect to the center C outside the area A in the display area B. That is, the areas B2 contains a portion obtained by eliminating the area A from a triangle CP1P2 formed of lines CP1 and CP2 connecting the center C of the object O and the corners P1 and P2, respectively, and a horizontal side P1P2 of the rectangle and a portion obtained by eliminating the area A from a triangle CP3P4 formed of lines CP3 and CP4 connecting the center C of the object O and the corners P3 and P4, respectively, and a horizontal side P3P4 of the rectangle.

As illustrated in FIG. 10A, if tap operation is performed when at least part of the touch area T is present in the area B2, as illustrated in FIG. 103, the display controller 21 virtually tilts the object O in the depth direction of the screen around the horizontal center line L2 of the object O and displays it. In this case, the display controller 21 displays the object O being tilted as if a tapped position (the position of the touch area T) is pressed in the depth direction of the screen.

Figure 11:
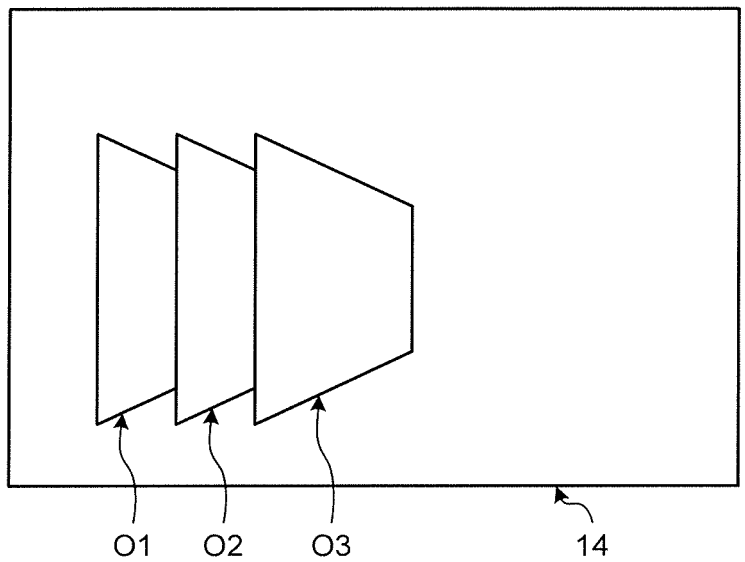
FIG. 11 is an exemplary diagram for explaining display of a plurality of objects overlaid one on top of another in the embodiment.

In this manner, if the area B1 or B2 is tapped, the object O is displayed tilted (rotated) in the depth direction. This downsizes the display area B of the object O (see FIG. 3). Accordingly, for example, as illustrated in FIG. 11, in the case of displaying a plurality of objects O1, O2, and O3, they can be displayed as being overlapped. Thus, more objects (O) can be displayed.

On the other hand, if the area A is tapped in FIG. 9A or 10A, the display control device 1 determines that the object O is to be selected or edited, and makes the object O selectable or editable. Regarding the selection and edition of the object O, general process is performed such as to display operation menu after selection, to activate an edit application, and the like.

Next, a description will be given of how to calculate the center coordinates of the object O having a shape not symmetric like a rectangle, a circle, an ellipse, and the like.

Figure 12:
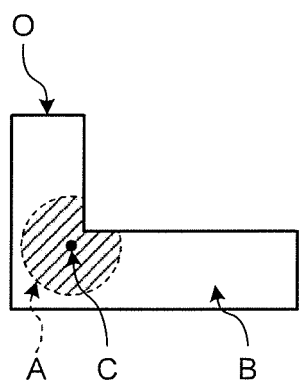
FIG. 12 is an exemplary schematic diagram of a predetermined area and the center of an asymmetric object in the embodiment.

FIG. 12 is a schematic diagram of an example of the predetermined area A and the center C of the asymmetric object O. In FIG. 12, the area A is inside a circle with the center C of the object O as the center and in the display area B of the object O. Besides, as illustrated in FIG. 12, if the display area B of the object O does not have a symmetric shape such as a rectangle, a circle, and an ellipse, the center C can be obtained by a conventional method. An example of the method will be described below.

Figure 13A:
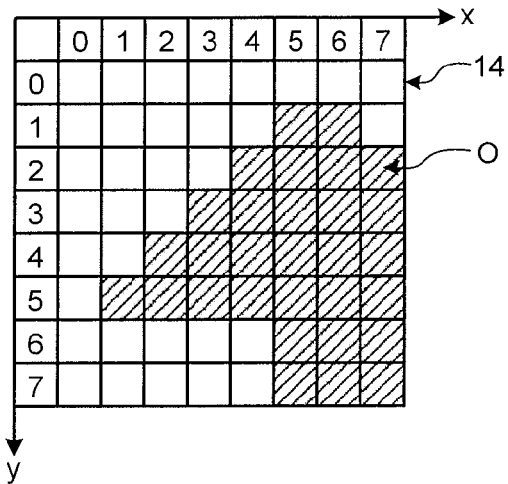
FIGS. 13A to 13C are exemplary diagrams for explaining how to calculate center coordinates in the embodiment.
Figure 13B:
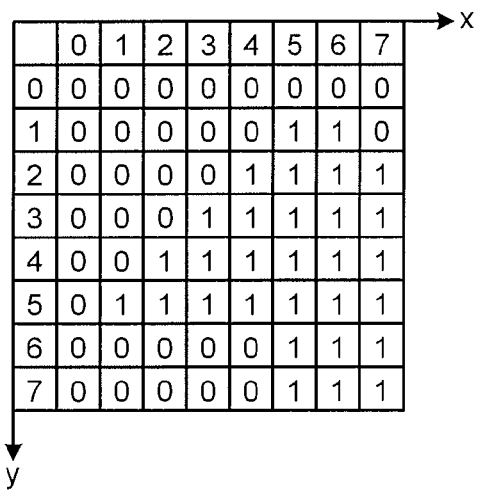
Figure 13C:
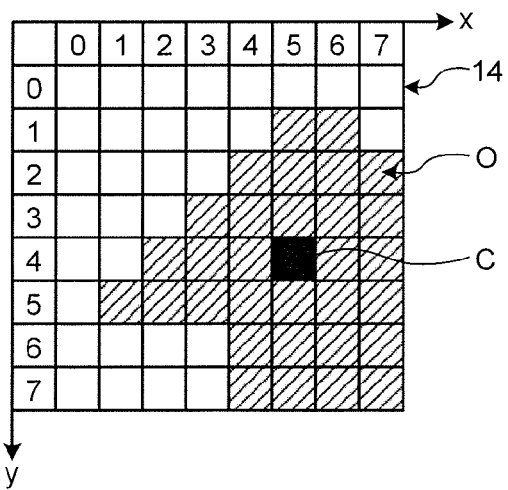

FIGS. 13A to 13C are diagrams for explaining an example of how to calculate the center coordinates of the asymmetric object O.

For simplicity, FIG. 13A illustrates only eight by eight pixels in the vertical and horizontal directions near the object O among the pixels of the display module 14. If, in FIG. 13A, the pixels are binarized by setting a value val (x, y) to 1 for pixels of the object O (hatched portion) and a value val (x, y) to 0 for pixels of other part (white portion), the pixels are represented as illustrated in FIG. 13B.

The center coordinates $(x_{center}, y_{center})$ can be obtained by the following equations 1 to 3:

$$SUM = \sum_{y=0}^{h-1} \sum_{x=0}^{w-1} val(x, y) \quad (1)$$

$$x_{center} = \sum_{y=0}^{h-1} \sum_{x=0}^{w-1} \left( \frac{1}{SUM} \times x \times val(x, y) \right) \quad (2)$$

$$y_{center} = \sum_{y=0}^{h-1} \sum_{x=0}^{w-1} \left( \frac{1}{SUM} \times y \times val(x, y) \right) \quad (3)$$

where h is the number of vertical pixels (8 in FIG. 13A), and w is the number of horizontal pixels (8 in FIG. 13A).

For example, the center coordinates of the object O of FIG. 13A are obtained as $x_{center}$=4.97 and $y_{center}$=4.10. If the numbers are rounded off to the nearest whole number, then $x_{center}$=5 and $y_{center}$=4. Thus, the center C of the object O can be obtained as illustrated in FIG. 13C.

A description will be given of a display control process performed by the display control device 1 for the object O. FIG. 14 is a flowchart of the display control process performed by the display control device 1 for the object O. In the following, the movement directions D1, D2, D3, and D4 of the touch area T described above are not particularly differentiated and will be referred to as "movement direction D".

First, the display control device 1 determines whether at least part of the touch area T is present in the display area B (S1). If the touch area T is not present in the display area B (No at S1), the process of S1 is repeated until it is determined that at least part of the touch area T is present in the display area B. If the touch area T is present in the display area B (Yes at S1), it is determined whether drag operation has been performed (S2).

If the drag operation has been performed that involves the movement of the touch area T (Yes at S2), it is determined whether at least part of the touch area T is present in the area A (S3). If at least part of the touch area T is present in the area A (Yes at S3), it is determined to move the object O. Thus, the object O is moved according to the movement direction D of the touch area T and displayed (S4). Then, the process returns to S1 to wait for input.

On the other hand, if it is determined that the touch area T is not present in the area A (No at S3), i.e., if it is determined that the touch area T is outside the area A, it is determined whether the movement direction D of the touch area T is within the first angle range θ1 (S5). If the movement direction D is within the first angle range θ1 (Yes at S5), it is determined to rotate the object O. Thus, the object O is rotated about the center C according to the movement direction D of the touch area T and displayed (S6). Then, the process returns to S1 to wait for input.

On the other hand, if the movement direction D of the touch area T is not within the first angle range θ1 (No at S5), it is determined whether the movement direction D is a direction away from the center C of the object O (S7). In other words, the display control device 1 determines whether the movement direction D of the touch area T is within the second angle range θ2 or the third angle range θ3.

If it is determined that the movement direction D of the touch area T is a direction away from the center C of the object O, i.e., the movement direction D is within the second angle range θ2 (Yes at S7), it is determined to zoom in the object O. Thus, the object O is zoomed in and displayed (S8). Then, the process returns to S1 to wait for input.

On the other hand, if it is determined that the movement direction D of the touch area T is not a direction away from the center C of the object O, i.e., the movement direction D is within the third angle range θ3 (No at S7), it is determined to zoom out the object O. Thus, the object O is zoomed out and displayed (S9). Then, the process returns to S1 to wait for input.

If it is determined that not drag operation but tap operation has been performed (No at S2), it is determined whether at least part of the touch area T is present in the area A (S10). If at least part of the touch area T is present in the area A (Yes at S10), it is determined that the object O is to be selected or edited. Thus, the object O is made selectable or edit able (S11). Then, the process returns to S1 to wait for input.

On the other hand, if it is determined that the touch area T is not present in the area A, i.e., outside the area A (No at S10), it is determined whether at least part of the touch area T is present in the area B1 (S12). If at least part of the touch area T is present in the area B1 (Yes at S12), the object O is tilted around the vertical center line L1 and displayed (S13). Then, the process returns to S1 to wait for input.

On the other hand, if it is determined that the touch area T is not present in the area B1 (No at S12), it is determined whether at least part of the touch area T is present in the area B2 (S14). If at least part of the touch area T is present in the area B2 (Yes at S14), the object O is tilted around the horizontal center line L2 and displayed (S15). Then, the process returns to S1 to wait for input.

As described above, according to the embodiment, the object O can be zoomed in, zoomed out, rotated, and tilted by only performing drag operation or tap operation in the display area B of the object O without using buttons for selecting zoom-in operation, zoom-out operation, rotation operation, tilt operation, and the like. With this, move operation, rotation operation, zoom-in operation, zoom-out operation, tilt operation can be automatically switched by a single touch point. Thus, the convenience is improved upon operating the object O.

A computer program can be executed on a computer to realize the same function as the display control device 1 of the embodiment. The computer program may be provided as being stored in a computer-readable storage medium, such as a compact disc-read only memory (CD-ROM), a flexible disk (FD), a compact disc recordable (CD-R), and a digital versatile disc (DVD), as a file in an installable or executable format.

The control program may also be stored in a computer connected via a network such as the Internet so that it can be downloaded therefrom via the network. Further, the control program may be provided or distributed via a network such as the Internet. The control program may also be provided as being stored in advance in ROM or the like.

While an example of display control process is described above in which the touch area T is one (single touch), there may be a plurality of touch areas (multi-touch). In this case, the same display control process as described above can be performed correspondingly to each of the touch areas.

According to the movement speed or acceleration of the touch area T, the object O may be moved or rotated by a distance corresponding to the movement speed or acceleration even after a touch object is separated from the touch panel 15. In this manner, if inertia is applied to the movement and the rotation of the object O, the user can move the object O as if moving a real object. Similarly, inertia may be applied to the zoom-in/out operation.

While the object O is described above to be rotated if the movement direction D is within a predetermined angle range, whether to rotate or zoom-in/out the object O may be determined based on other conditions. For example, if the change in the distance between the center C of the object O and a point in the touch area T is within a predetermined range before and after the movement of the touch area T, the object O may be moved or rotated. If the change exceeds a predetermined distance, the object O may be zoomed in. On the other hand, if the change is smaller than the predetermined distance, the object O may be zoomed out.

Further, while the first angle range θ1, the second angle range θ2, and the third angle range θ3 are described above as the same angle range using a common angle α, they may be different.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display control device comprising:
   an area determination module configured to determine, on a touch panel comprising input coordinates corresponding to display coordinates of a display module, whether at least part of a touch area where a touch object touches is present in a predetermined area in a display area displaying an object displayed on the display module;
   a direction determination module configured to determine a movement direction of the touch area; and
   a display controller configured to display the object as being zoomed in if at least part of the touch area is inside the display area of the object but outside the predetermined area, and also if the touch area moves toward outside the object in a direction away from a center of the object.

2. A display control device comprising:
   an area determination module configured to determine, on a touch panel comprising input coordinates corresponding to display coordinates of a display module, whether at least part of a touch area where a touch object touches is present in a predetermined area in a display area displaying an object displayed on the display module;
   a direction determination module configured to determine a movement direction of the touch area; and
   a display controller configured to display the object as being zoomed out if at least part of the touch area is inside the display area of the object but outside the predetermined area, and also if the touch area moves toward a center of the object.

3. The display control device of claim 1, wherein the predetermined area is inside a circle with a radius corresponding to a predetermined ratio of a length of the display area of the object, a center of the predetermined area corresponding to a center of the display area.

4. The display control device of claim 1, wherein the predetermined area is inside a shape similar to the object in a size corresponding to a predetermined ratio of a size of the display area of the object, a center of the predetermined area corresponding to a center of the display area.

5. The display control device of claim 1, wherein the display controller is configured to rotate the object about a center of the display area of the object if at least part of the touch area is inside the display area of the object but outside the predetermined area, and also if the touch area moves in a direction within a predetermined angle range, a center of the predetermined angle range corresponding to a direction perpendicular to a straight line between a center of the display area of the object and a point in the touch area.

6. The display control device of claim 1, wherein
   the area determination module is configured to determine whether at least part of the touch area is present in a second area, and
   the display controller is configured to display the object as being tilted in a depth direction of a screen of the display module if tap operation is performed when at least part of the touch area is present in the second area.

7. The display control device of claim 6, wherein the second area comprises areas which are symmetric with respect to the center of the object outside the predetermined area in the display area.

8. A display control method applied to a display control device, the display control method comprising:
   determining, by an area determination module, on a touch panel comprising input coordinates corresponding to display coordinates of a display module, whether at least part of a touch area where a touch object touches is present in a predetermined area in a display area displaying an object displayed on the display module;
   determining, by a direction determination module, a movement direction of the touch area; and
   displaying, by a display controller, the object as being zoomed in if at least part of the touch area is inside the display area of the object but outside the predetermined area, and also if the touch area moves toward outside the object in a direction away from a center of the object.

9. A display control method applied to a display control device, the display control method comprising:
   determining, by an area determination module, on a touch panel comprising input coordinates corresponding to display coordinates of a display module, whether at least part of a touch area where a touch object touches is present in a predetermined area in a display area displaying an object displayed on the display module;
   determining, by a direction determination module, a movement direction of the touch area; and
   displaying, by a display controller, the object as being zoomed out if at least part of the touch area is inside the display area of the object but outside the predetermined area, and also if the touch area moves toward a center of the object.

10. The display control device of claim 2, wherein the predetermined area is inside a circle with a radius corresponding to a predetermined ratio of a length of the display area of the object, a center of the predetermined area corresponding to a center of the display area.

11. The display control device of claim 2, wherein the predetermined area is inside a shape similar to the object in a size corresponding to a predetermined ratio of a size of the display area of the object, a center of the predetermined area corresponding to a center of the display area.

12. The display control device of claim 2, wherein the display controller is configured to rotate the object about a center of the display area of the object if at least part of the touch area is inside the display area of the object but outside the predetermined area, and also if the touch area moves in a direction within a predetermined angle range, a center of the predetermined angle range corresponding to a direction perpendicular to a straight line between a center of the display area of the object and a point in the touch area.

13. The display control device of claim 1, wherein
the area determination module is configured to determine whether at least part of the touch area is present in a second area, and
the display controller is configured to display the object as being tilted in a depth direction of a screen of the display module if tap operation is performed when at least part of the touch area is present in the second area.

14. The display control device of claim 13, wherein the second area comprises areas which are symmetric with respect to the center of the object outside the predetermined area in the display area.

* * * * *